(12) United States Patent
Grott et al.

(10) Patent No.: US 7,866,030 B2
(45) Date of Patent: Jan. 11, 2011

(54) PROCESS FOR FORMING A LAMINATION STACK

(75) Inventors: Tarcisio Joao Grott, Joinville-Sc (BR); Heber De Carvalho Hespanhol, Joinville-Sc (BR); Hermann Otto Knupfer, Joinville-Sc (BR); Anderson Wolf, Joinville-Sc (BR); Gilberto Lenkulkul, Joinville-Sc (BR); Sergio Do Rosario, Joinville-Sc (BR)

(73) Assignee: Whirlpool S.A., Sao Paulo-Sp (BR)

( * ) Notice: Subject to any disclaimer, the term of this patent is extended or adjusted under 35 U.S.C. 154(b) by 0 days.

(21) Appl. No.: 12/819,645

(22) Filed: Jun. 21, 2010

(65) Prior Publication Data

US 2010/0257724 A1 Oct. 14, 2010

Related U.S. Application Data

(62) Division of application No. 11/814,032, filed as application No. PCT/BR2006/000049 on Mar. 16, 2006, now Pat. No. 7,768,375.

(30) Foreign Application Priority Data

Mar. 17, 2005 (BR) .................................... 0500879

(51) Int. Cl.
*H01F 3/04* (2006.01)
(52) U.S. Cl. ...................................................... 29/609

(58) Field of Classification Search ................. 336/212, 336/233–234; 29/598–602.1, 609
See application file for complete search history.

(56) References Cited

U.S. PATENT DOCUMENTS

| 4,738,020 | A | * | 4/1988 | Neuenschwander | .......... 29/598 |
| 5,894,182 | A | | 4/1999 | Saban et al. | |
| 6,002,191 | A | | 12/1999 | Saban | |
| 6,252,329 | B1 | | 6/2001 | Del Fabbro | |
| 6,847,285 | B2 | | 1/2005 | Sirois et al. | |
| 6,975,201 | B2 | | 12/2005 | Sirois | |
| 6,984,913 | B2 | * | 1/2006 | Neuenschwander | .. 310/216.048 |
| 2003/0030535 | A1 | | 2/2003 | Sirois et al. | |
| 2004/0032316 | A1 | | 2/2004 | Sirois | |
| 2004/0083600 | A1 | * | 5/2004 | Neuenschwander et al. | ... 29/609 |

FOREIGN PATENT DOCUMENTS

EP 0847109 A2 6/1998

* cited by examiner

*Primary Examiner*—Tuyen Nguyen
(74) *Attorney, Agent, or Firm*—Gifford, Krass, Sprinkle, Anderson & Citkowski, P.C.

(57) ABSTRACT

A process for forming a lamination stack of superposed metallic laminations, comprising the steps of: providing a locking lamination having locking openings adjacent to respective projecting tabs; providing a passage lamination with passage openings, each having a deformed edge portion; axially aligning and fitting each tab of the locking lamination through a passage opening of the passage lamination; and pressing each tab against an adjacent face of the passage lamination, until each tab is contained in a respective passage opening of the passage lamination and partially seated on an edge portion of the passage opening, deformed to the inside of the locking opening of the locking lamination, axially locking the latter to the passage lamination.

15 Claims, 14 Drawing Sheets

PROCESS FOR FORMING A LAMINATION STACK

CROSS REFERENCE TO RELATED APPLICATIONS

This Application is a Division of U.S. application Ser. No. 11/814,032 filed on Aug. 8, 2007, which is the National Stage of PCT/BR2006/000049, filed on Mar. 16, 2006, which claims priority of Brazil Application No. PI0500879-4 filed on Mar. 17, 2005, which are herein incorporated by reference.

FIELD OF THE INVENTION

The present invention refers, in general terms, to a process for carrying out the assembly and mutual fixation of metallic laminations upon stacking a plurality of said metallic laminations to form a stack. The lamination stack is, for example, of the type used in a stator and/or rotor of electric motors, such as those used in refrigeration compressors.

PRIOR ART

There are known from the prior art some solutions for fastening metallic laminations together to form the lamination stack of an electric motor.

In one of said known solutions, the metallic laminations that form the lamination stack are superposed and maintained in this position, by fitting a projection into a recess or cavity, as disclosed in patent document EP0847109, in which said parts are mutually fitted with interference.

In this solution, a progressive tool cuts a metal plate, which will form the lamination, in several stages, until it presents all the desired lamination details. In the last stage, said metallic lamination will be cut out from the rest of the plate, at each stroke of the press and deposited, with interference, into a slot known as lamination brake. In the following stroke, the tool cuts out other lamination to be deposited over the previous one. The previous lamination suffers friction force of the brake and the cut out lamination is pushed by a device provided at the upper part of the tool, these forces thus making the projection of the cut out lamination penetrate with interference into the recess of the previous lamination.

One of the problems related to the interference between the projection and the recess is the mechanical characteristics of the material that forms the plate to be stamped. The projection is often crushed or deformed, due to interference and to the mechanical characteristics of the plate. Thereby, the projection is prevented from penetrating into the recess to fasten the lamination, as the latter is pushed upwardly.

To minimize such problems, the solution above requires fine tolerance in the production of metallic laminations, in order to form, when the latter are superposed, a lamination stack capable of maintaining a good rotational interlocking of its laminations.

Besides the tolerance requirement, said solution has the disadvantage of presenting a fragile axial locking stability of the lamination stack formed with the laminations constructed by this process, since said laminations do not provide a reliable mutual retention in the axial direction (only in the rotational direction), permitting constant breaks and collapse of the lamination stack to occur upon formation of the latter.

In other known solution (US2003/0030535), the metallic laminations are interlocked when superposed in the position for forming the lamination stack, by the action of clamps, in the form of tabs, projecting from an external peripheral edge of an end metallic lamination or from the peripheral edge of each inner hole of said end lamination, said tabs being inserted through axial holes provided in the lamination stack, by axially aligning the inner holes of each lamination of the lamination stack, so that each tab presents a respective projecting end portion seated onto an external face of the other opposite end lamination.

While this solution leads to a lamination stack presenting a good axial locking of the laminations that form said stack, it has the disadvantage of resulting in a deficient rotational locking, which, in the case of the lamination stacks for electric motors, may generate gaps and relative rotational movements between the laminations of the stack, which jeopardize the formation of the stator and/or rotor constructed with this lamination stack, mainly upon the injection of aluminum through the conventional grooves of said lamination stack.

Moreover, such construction requires the provision of very long tabs to form the stacks of the type used, for example, in electric motors to be applied to refrigeration compressors. The requirement of longer tabs extending through all the laminations of the lamination stack requires a large amount of material to be removed from the lamination provided with said tabs, in the case of tabs located inside the outer peripheral contour of the lamination, or a large extension of said tabs when provided from the external edge of the lamination that carries said tabs, excessively consuming the material of the plate that forms the laminations of the lamination stack.

In addition, the tabs of the solution above present a free end portion, whose thickness projects outwardly from the plane of the last lamination of the stack fastened by said tabs, increasing the thickness of said stack, which may impede the utilization of the latter in applications, such as electric motors for compressors.

Patent document US2004/0032316 discloses another construction for a lamination and lamination stack, in which each lamination is provided with a tab projecting to one of the sides of the plane of the lamination and configured to pass through a through-hole of a second subsequent lamination overlying the first lamination, said second lamination having an external face opposite to that face to be seated onto the first lamination and onto which is bent and seated a free end of the tab. In this construction, the end portion of each tab projects from the plane of the lamination onto which said tab is seated, increasing the thickness of the stack, as in the solution described above. To prevent said end portion from interfering with the mutual seating of the laminations of the stack, each lamination further presents another opening, which is defined only to allow fitting each tab end portion, with no function of mutually securing said parts.

While resulting in a lamination stack presenting a good axial locking of the laminations that form said stack, this solution has the disadvantage of leading to a deficient rotational locking of low reliability and which, as the solution described above in the case of lamination stacks for electric motors, gives rise to gaps and relative rotational movement between the laminations of the stack, impairing the formation of the stator and/or rotor constructed with said lamination stack, mainly upon injecting aluminum through the conventional grooves of said lamination stacks, since said grooves must be aligned according to the design of the rotor cage lateral bars. The occurrence of misalignment between said grooves generate inner teeth that impair the passage of aluminum through said grooves, jeopardizing the angle of the rotor cage bars required in electric motors.

Besides the critiques above, another problem of these solutions regarding the rotational interlocking of the laminations of the lamination stack refers to the technical difficulty in obtaining tabs with a width to be fitted, with lateral interference, in the width of the through-holes.

Another problem of the known solutions refers to the process requirements for obtaining the metallic laminations, as they require a higher number of process steps and operating functions of the tools used, which impairs the operating speed, reducing productivity and increasing the manufacturing cost.

OBJECTS OF THE INVENTION

It is an object of the present invention to provide a metallic lamination to be placed over other metallic lamination upon the formation of a lamination stack, which allows said laminations to be safely and reliably assembled and axially and rotationally fastened together, without increasing the thickness of the lamination stack to be formed.

It is also an object of the invention to provide a lamination stack, as cited above, which requires a reduced force to rotationally and axially fasten the laminations together.

It is a further object of the invention to provide a metallic lamination and a stack of metallic laminations, as mentioned above, which can be obtained without impairing, in the manufacturing process thereof, the operating speed of the tools employed and without increasing the manufacturing cost of the laminations and lamination stack.

It is an additional object of the invention to provide the lamination stack as defined above, which can be repeatedly obtained within a desired pattern, even when batches of different materials are used.

It is an object of the invention to provide a process for producing a lamination stack, with the metallic lamination being placed over other metallic lamination upon the formation of a lamination stack, which allows said laminations to be safely and reliably assembled and axially and rotationally fastened together, without increasing the thickness of the lamination stack to be formed, said process minimizing the different mechanical characteristics of the material used (one of the existing problems), allowing to interconnect laminations made of different materials.

It is also an object of the invention to provide a process, as cited above, which requires a reduced force to rotationally and axially fasten the laminations together.

It is a further object of the invention to provide a process, as mentioned above, in which the lamination stack can be obtained without impairing the operating speed of the tools employed and without increasing the manufacturing cost of the laminations and lamination stack.

It is an additional object of the invention to provide the process as defined above, in which the laminations can be repeatedly obtained within a desired pattern, even when batches of different materials are used.

SUMMARY OF THE INVENTION

These and other objectives are achieved with a process which allows to obtain a stack of metallic laminations comprising at least two superposed laminations, said stack comprising at least one locking lamination, which is medianly provided with at least two locking openings, and with at least one passage lamination comprising, medianly, at least two passage openings, each locking lamination incorporating, adjacent to each locking opening, a tab projecting to one of the sides of said locking lamination, in order to pass through a passage opening of a passage lamination seated against the locking lamination, said tab being bent so as to remain contained in said passage opening of the passage lamination and partially seated on an edge portion of the same passage opening of the passage lamination, deformed to one of the sides of said passage lamination, to the interior of the locking opening of the locking lamination, axially locking the latter to the passage lamination, at least one of the parts of locking lamination and passage lamination further comprising a lock means actuating in a lock receiving means provided in the other of said parts, in order to provide a relative rotational locking between each two adjacent laminations.

The process of the present invention, for obtaining the lamination stack comprises the steps of: providing a locking lamination with at least two locking openings and incorporating, adjacent to each locking opening, a tab projecting to one of the sides of said locking lamination; providing a passage lamination with at least two passage openings, each defining an edge portion that is deformed to one of the sides of said lamination; aligning and fitting each tab of the locking lamination through a passage opening of the passage lamination; and pressing each tab of the locking lamination against an adjacent face of the passage lamination, opposite to that face to be seated onto the locking lamination, until each tab is contained in a respective passage opening of the passage lamination and partially seated on an edge portion of the passage opening of the passage lamination, deformed to the inside of the locking opening of the locking lamination, axially locking the latter to the passage lamination.

The present invention further provides a lamination made of a metal piece, comprising, medianly, at least two locking openings, said lamination incorporating, adjacent to each of the locking openings, a tab projecting to one of the sides of said lamination, said lamination further comprising at least one of the parts defined by a lock means and by a lock receiving means, in order to provide a relative rotational locking between each two adjacent laminations employed in the formation of a lamination stack.

BRIEF DESCRIPTION OF THE DRAWINGS

These and other objectives and advantages of the present invention will become more apparent by reference being made to the drawings, given by way of example of the embodiments of the invention and in which:

FIG. 2c is a partial sectional view of the passage lamination, taken according to line II-II of FIGS. 1b and 2a;

DETAILED DESCRIPTION OF THE PREFERRED EMBODIMENTS

The present invention will be described in relation to metallic laminations in the form of a disc having a central hole and which is usually obtained by stamping a metal plate 1, said laminations being particularly applied in the formation of a lamination stack, for example, of an electric motor. It should be understood, however, that the invention can be applied to secure together two or more laminations for different usages.

The lamination stack of the present invention comprises at least two superposed laminations, at least one of them being a locking lamination 10 which is provided, medianly, with at least two locking openings 11, said locking lamination 10 incorporating, adjacent to each of said locking openings 11, a tab 12 projecting to one of the sides of said locking lamination 10.

Figure 1:
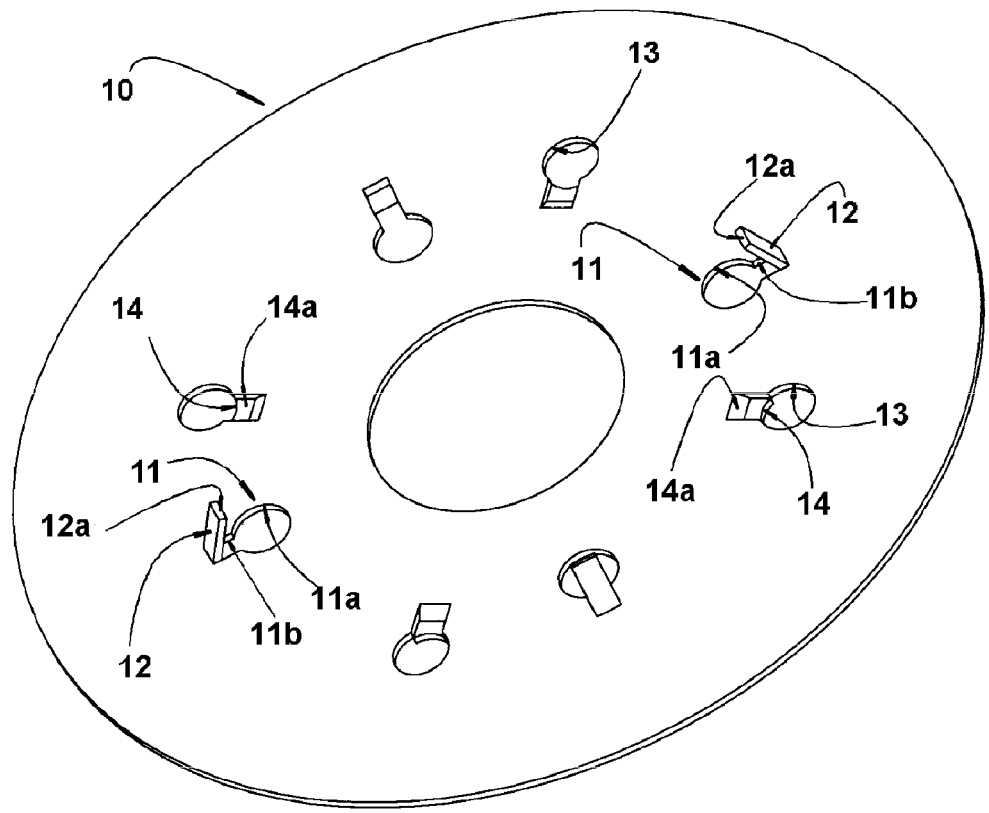
FIG. 1 is a perspective view of a locking lamination constructed according to the present invention.
Figure 1A:
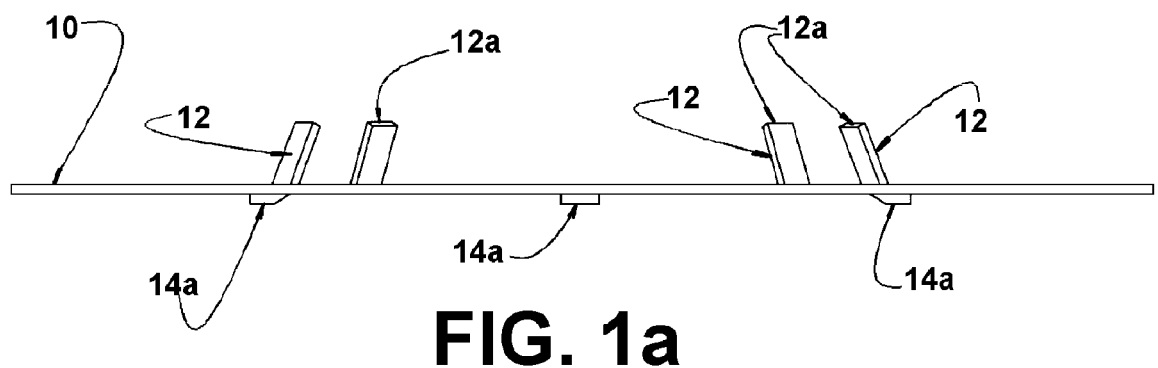
FIG. 1a is a side elevational view of the lamination illustrated in FIG. 1.
Figure 1B:
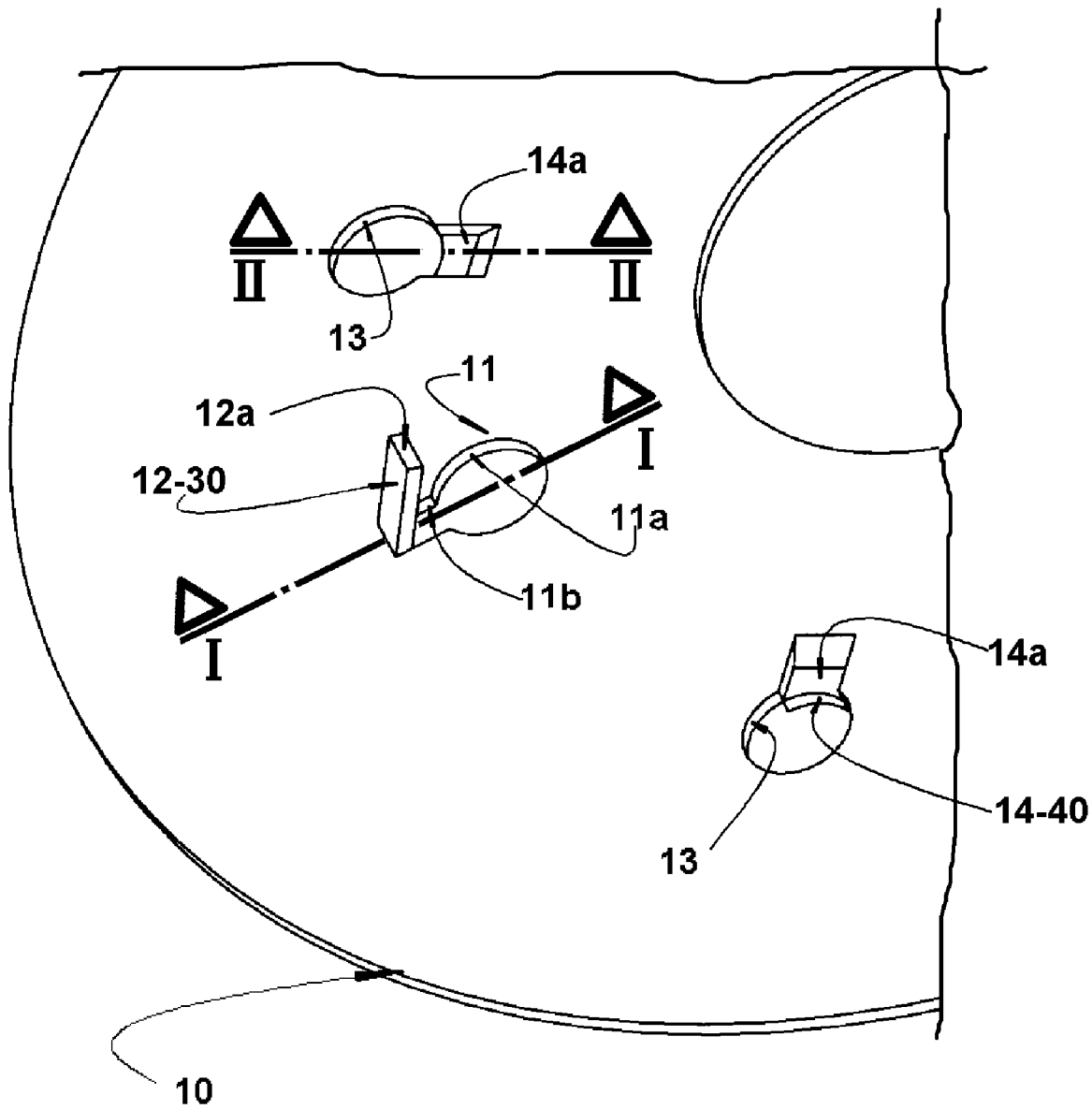
FIG. 1b is an enlarged and partial perspective view of the locking lamination illustrated in FIG. 1.

According to the illustrations of FIGS. 1, 1a and 1b, the locking lamination 10 further presents at least two passage openings 13. In a constructive option of the present invention, illustrated in FIG. 1c and to be discussed below, the locking lamination 10 can present only locking openings 11.

As illustrated in FIGS. 1, 1a and 1b, the locking lamination 10 has its locking openings and passage openings 11, 13, in alternate relationship in the same alignment, for example, distributed in the same circular alignment around a central axis of the locking lamination 10.

Figure 2:
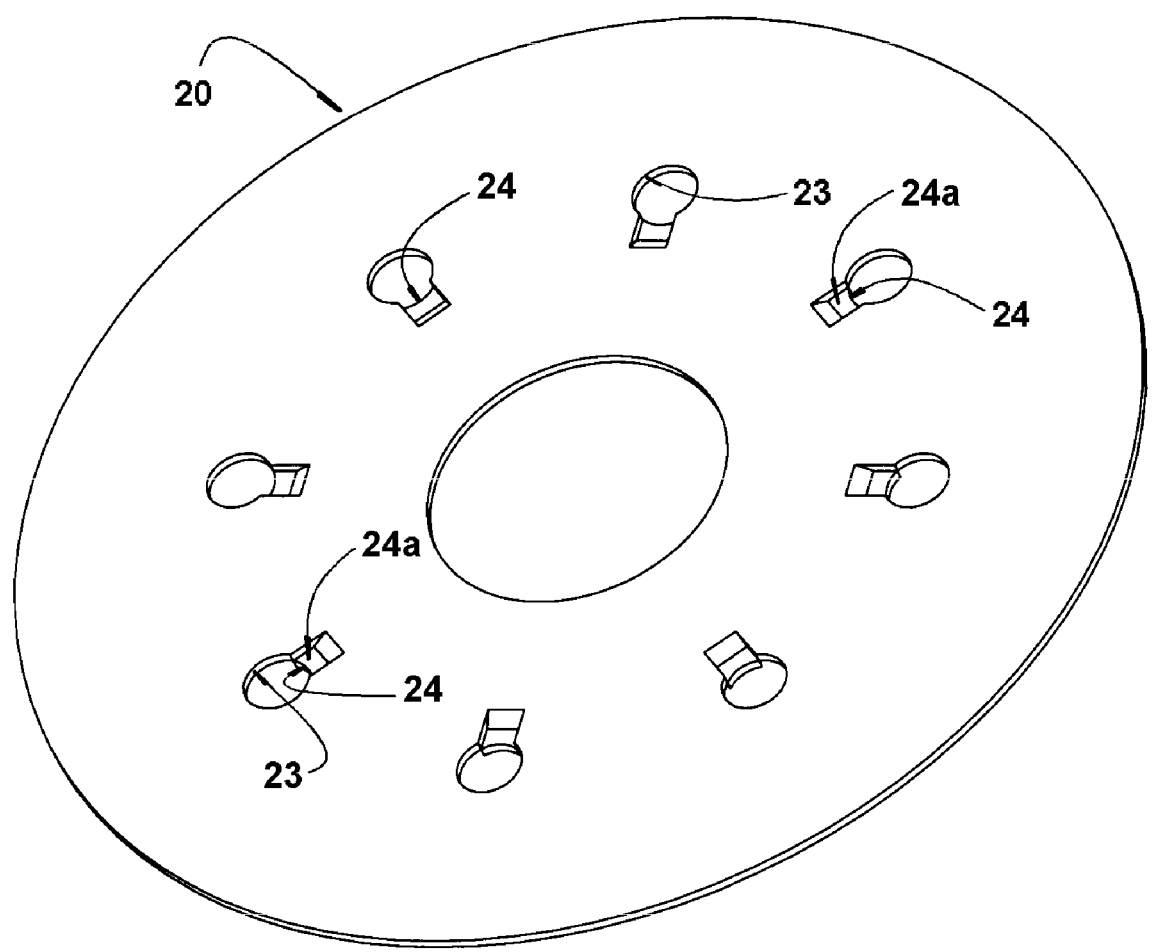
FIG. 2 is a perspective view of a passage lamination constructed according to the present invention.
Figure 2A:
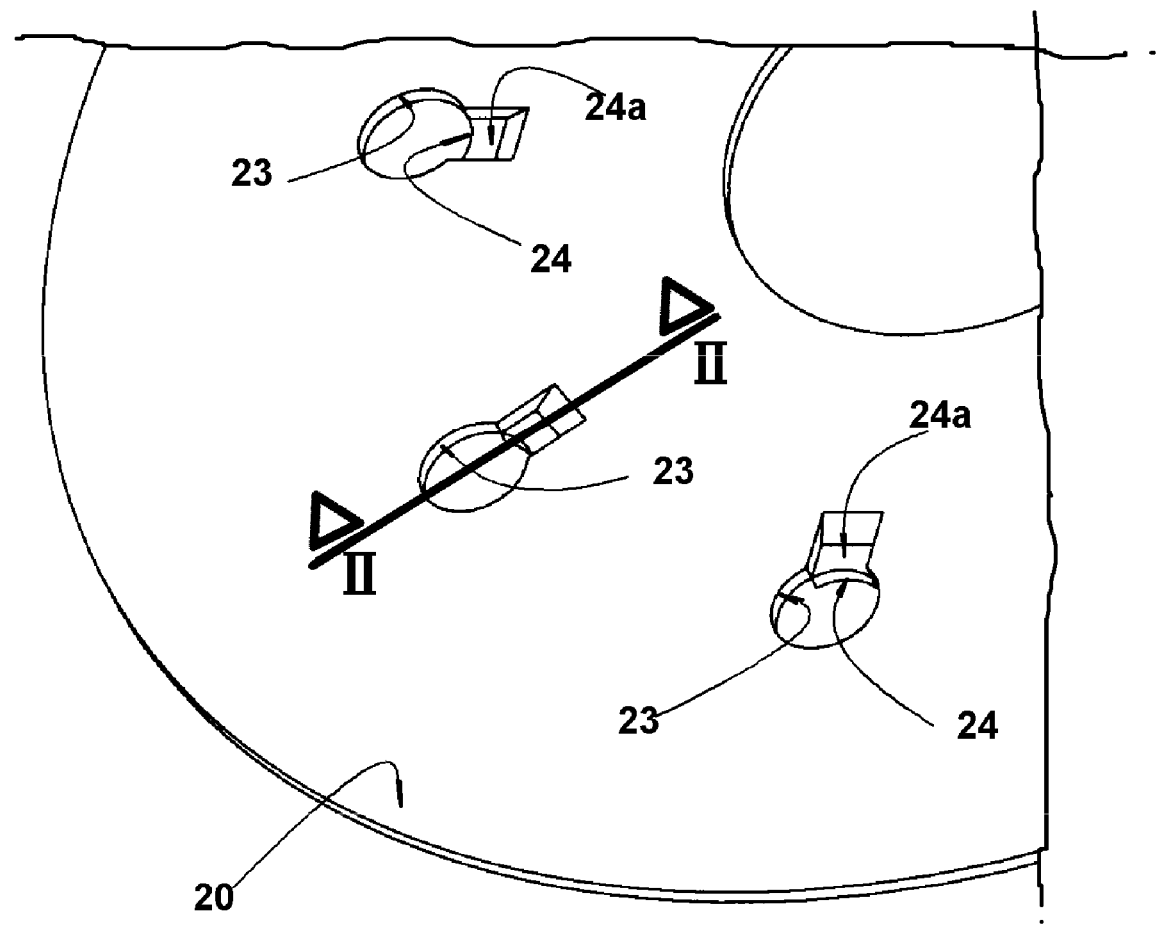
FIG. 2a is an enlarged and partial perspective view of the passage lamination illustrated in FIG. 2.

The lamination stack of the present invention can also comprise at least one passage lamination 20 provided, medianly, with at least two passage openings 23, as illustrated in FIG. 2 and disposed according to the same alignment applied to the locking openings 11 of the locking lamination 10.

According to a way of carrying out the present invention, between the locking lamination 10 and the passage lamination 20, which form a lamination stack, is provided at least one intermediary lamination defined by one of said locking lamination 10 and passage lamination 20.

It should be understood that the lamination stack of the present invention may comprise:

a locking lamination 10 and a passage lamination 20 disposed over said locking lamination 10;

a locking lamination 10 and a plurality of passage lamination 20 stacked over said locking lamination 10, in which situation the tab 12 has its extension dimensioned to pass through the passage openings 23 of the passage laminations 20 stacked over the locking lamination 10; and a plurality of locking laminations 10 stacked and locked to each other in pairs, and a passage lamination 20 disposed over the assembly of locking laminations 10.

Figure 3:
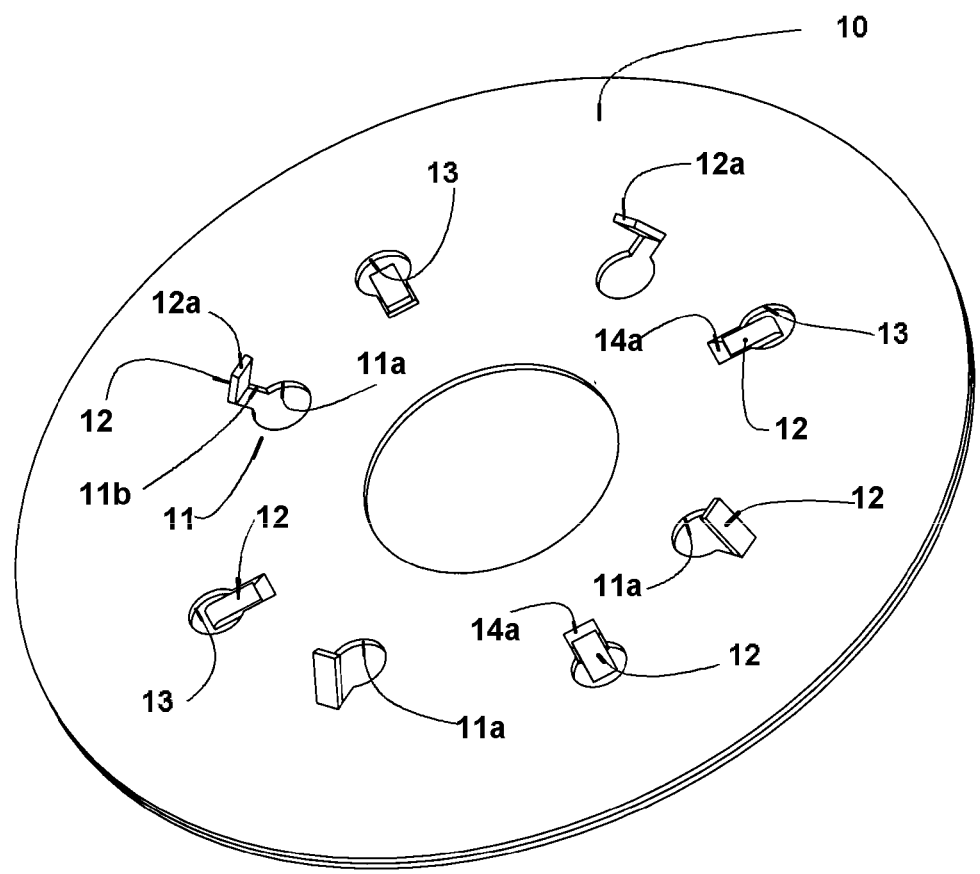
FIG. 3 is a perspective view of a lamination stack being formed and comprising a locking lamination onto which is seated and retained another locking lamination, said laminations being of the type illustrated in FIGS. 1, 1a and 1b.
Figure 3A:
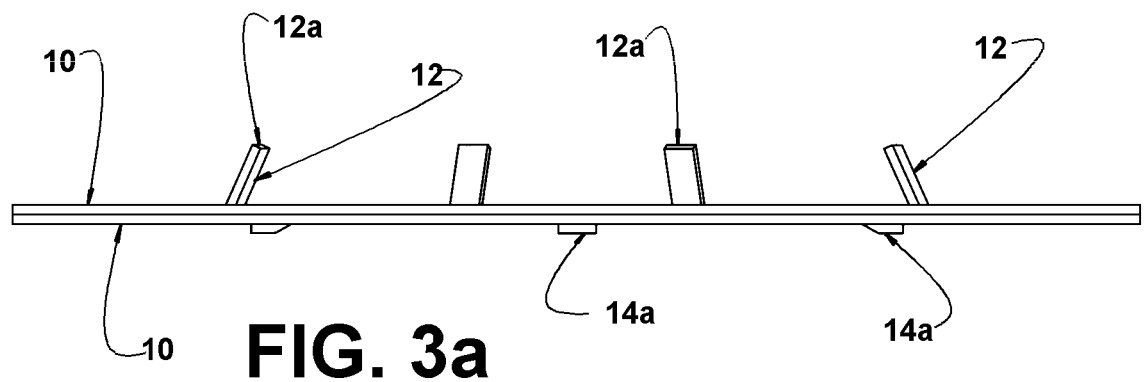
FIG. 3a is a side elevational view of the lamination stack being formed, as illustrated in FIG. 3.
Figure 3B:
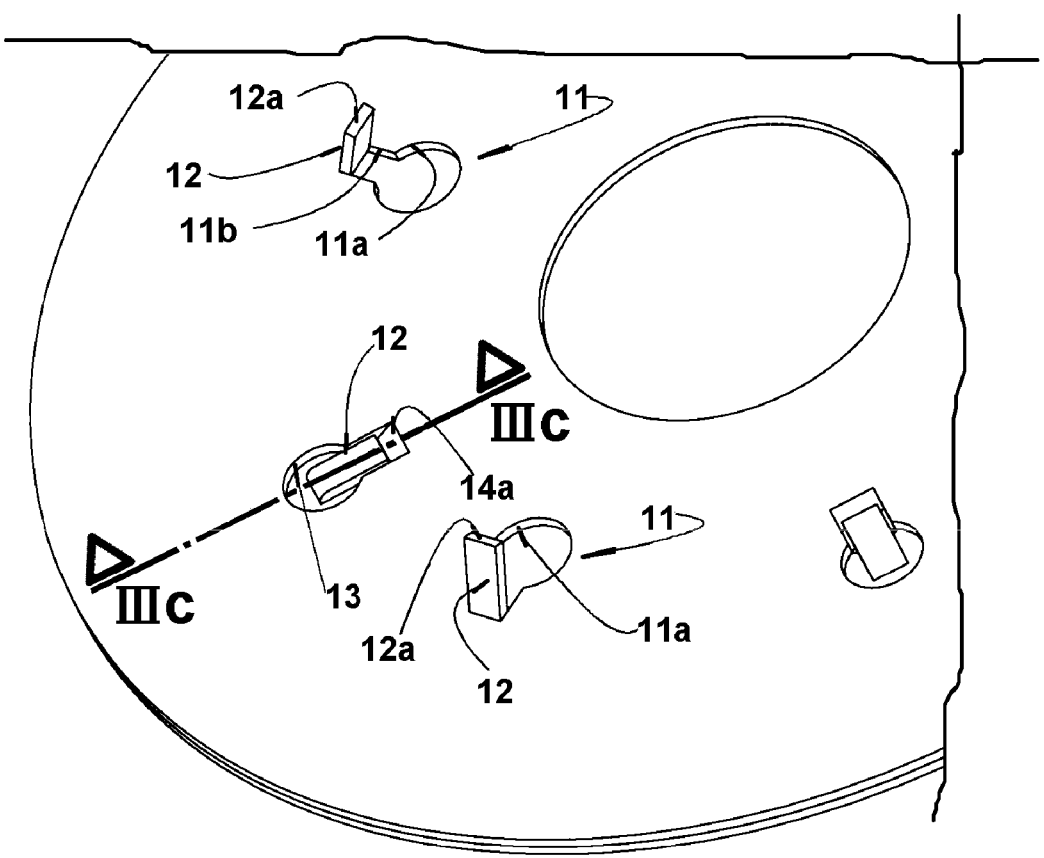
FIG. 3b is an enlarged and partial perspective view of the lamination stack of FIG. 3.
Figure 3C:
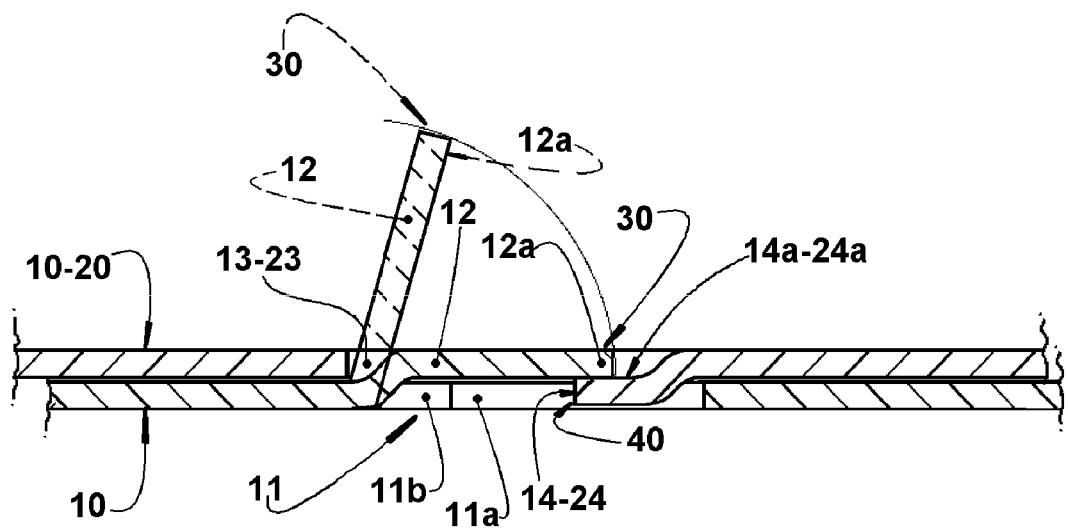
FIG. 3c is a partial sectional view of the lamination stack of FIGS. 3, 3a and 3b, taken according to the line IIIC-IIIC in said FIG. 3b.
Figure 3D:
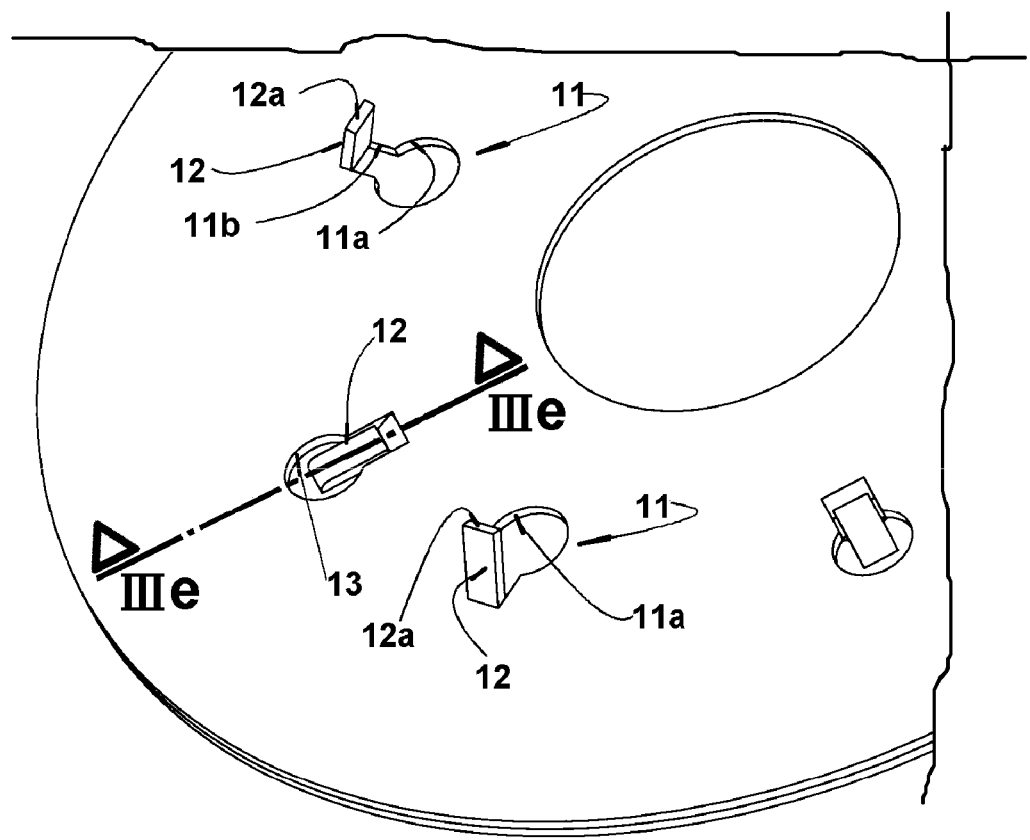
FIG. 3d is an enlarged and partial perspective view of the lamination stack of FIG. 3, formed with locking laminations of the type illustrated in FIG. 1c.
Figure 3E:
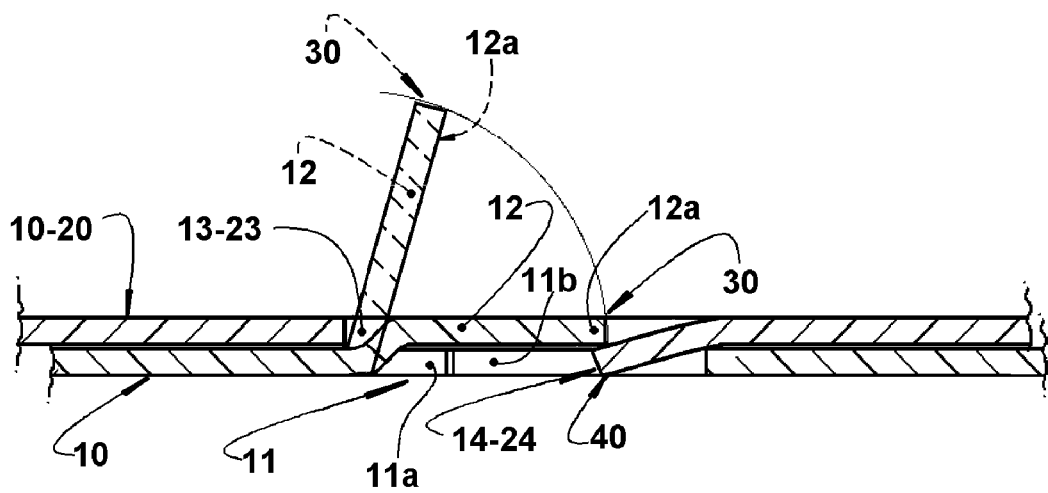
FIG. 3e is a partial sectional view of the lamination stack of FIGS. 3 and 3b, taken according to line IIIE-IIIE in said FIG. 3d.
Figure 4:
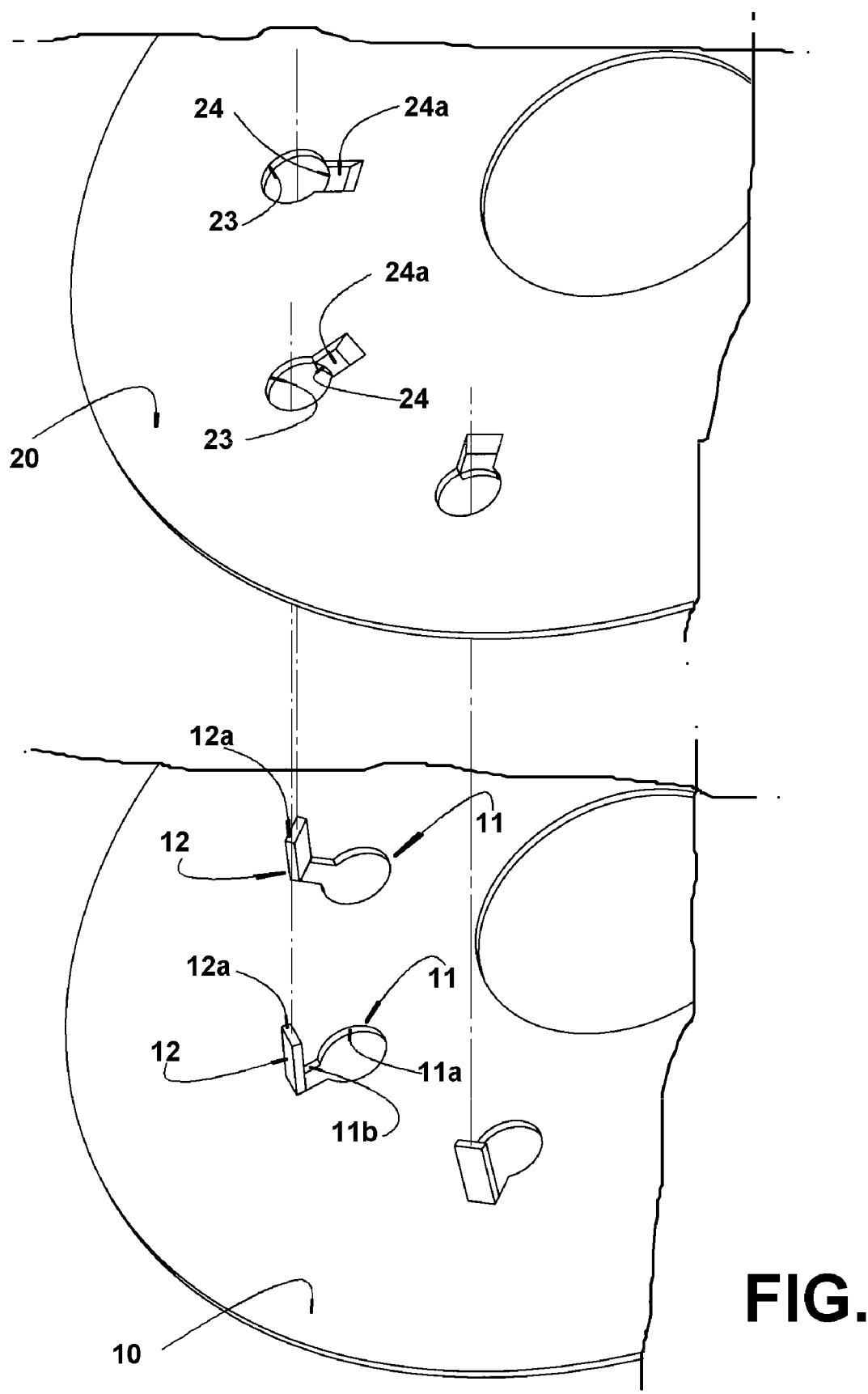
FIG. 4 is an enlarged, partial and exploded perspective view of a lamination stack comprising a locking lamination provided only with locking openings and onto which is seated and retained a passage lamination of the type illustrated in FIG. 2.

According to the present invention, each tab 12 of a locking lamination 10 is provided so as to pass through a passage opening 13, 23 of another locking lamination 10 or of another passage lamination 20 disposed immediately above the first, said tab 12 being bent in such a way as to remain contained in a passage opening 13, 23 of the adjacent upper lamination that forms the stack and partially seated on an edge portion 14, 24 of the same passage opening 13, 23 of the adjacent upper lamination, and deformed, to one of the sides of said lamination, to the inside of the locking opening 11 of the adjacent lower locking lamination 10, axially locking said laminations I superposition, as illustrated in FIGS. 3c and 3e.

According to the illustrations, each locking opening 11 comprises a first hollow portion 11a, generally circular or substantially circular and radially extending in a second hollow portion 11b. To the interior of said hollow portions 11a, 11b is deformed an edge portion 14, 24 of a passage opening 13, 23 of an adjacent upper locking lamination 10 or passage lamination 20 of the stack. Each tab 12 is formed of the lamination material that is removed to form the respective locking opening 11, said tab 12 projecting to one of the sides of the locking lamination 10, from an end edge of the second hollow portion 11b opposite to that opened to the first hollow portion 11a of the respective locking opening 11, from a previously determined angle of inclination, in relation to a plane of the face of the locking lamination 10, from which said tab 12 projects, of about 45°-90°. In the illustrated constructions, each tab 12, before seating against an adjacent locking lamination 10, is positioned at about 60° from the projection face of the respective locking lamination 10.

Figure 6:
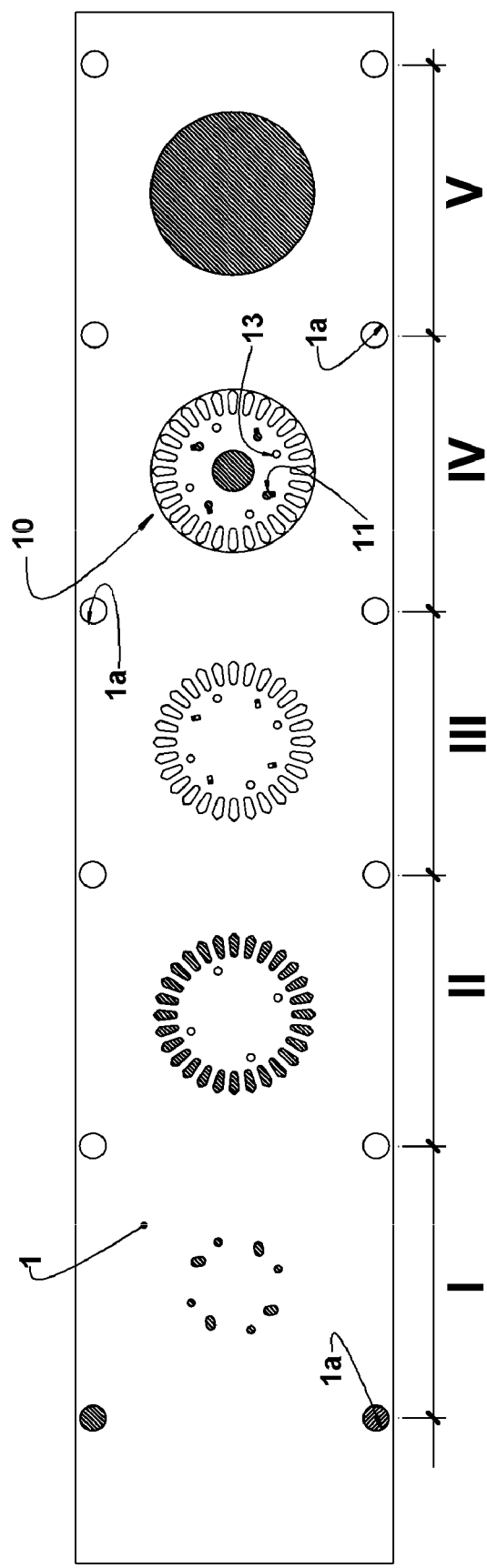
FIG. 6 schematically illustrates an upper plan view of a metal plate in different manufacturing phases of a lamination of a lamination stack according to the present invention, said different phases being indicated by references I-V.

The passage openings 13 are defined by material being removed from the metal plate 1 that forms the laminations of the stack, during the manufacturing process of the metallic laminations, as illustrated in FIG. 6.

In accordance with the illustrations of the appended drawings, from a radially innermost edge of each passage opening 13, 23 is defined a respective edge portion 14, 24, which, in an embodiment of the present invention, is previously deformed, for example, by drawing, defining a recess 14a, 24a, in which a free end 12a of a respective tab 12 (FIG. 3c) is seated, whereas in another embodiment of the present invention, said edge portion 14, 24 is deformed by seating the free end 12a of the tab 12 against the lamination in which said passage opening 13, 23 is provided (FIG. 3d).

According to the present invention, at least one of the parts of locking lamination 10 and passage lamination 20 further comprises a lock means 30 actuating in a lock receiving means 40 provided in the other of said parts, so as to provide a relative rotational locking between each two adjacent laminations of the stack.

In accordance with the embodiment of the present invention provided with the passage openings 13, 23, previously deformed to form the recess 14a, 24a, as illustrated in FIGS. 1, 1b, 1e, 2 and 2a, the seating of the free end 12a of each tab 12 of a locking lamination 10 in a respective recess 14a, 24a previously formed in an adjacent lamination, usually do not guarantee a rotational locking with no gaps between the two laminations, as a function of the dimensional tolerances in the width of both the tab 12 and the preformed recess 14a, 24a. In this embodiment, the lock means 30 comprises at least one projection 31 provided in the surface of at least one of said laminations and which is configured to be tightly fitted in a lock receiving means 40 defined in the other lamination and which may take the form of a recess 41.

In the illustrated embodiment, each projection 31 has a substantially semi-spherical shape, it being understood that said projection 31 may present different geometries, each recess 41 having a cross section that is similar to and slightly larger than that of a respective projection 31 so that, upon stacking one lamination on top of another, the projection 31 of one lamination fits into the recess 41 of the other lamination, rotationally interlocking the two laminations.

Figure 5:
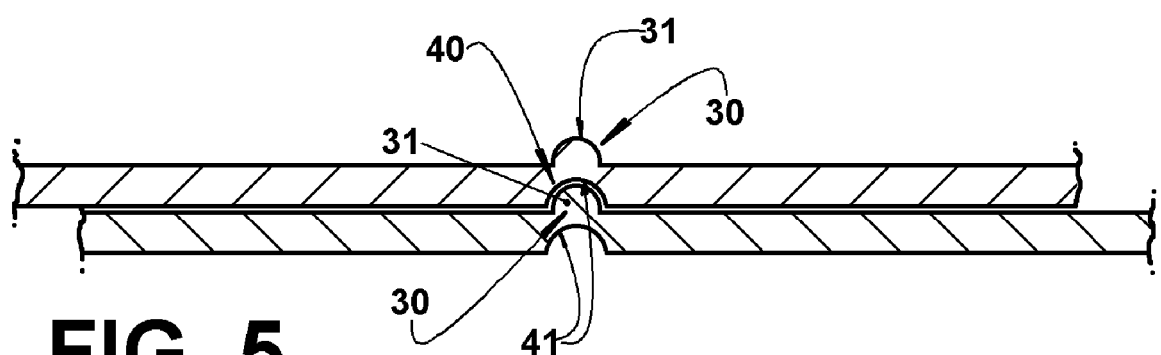
FIGS. 5 and 5a are sectional views of a lamination stack formed by two superposed laminations and illustrating a construction for the lock receiving means.
Figure 5A:
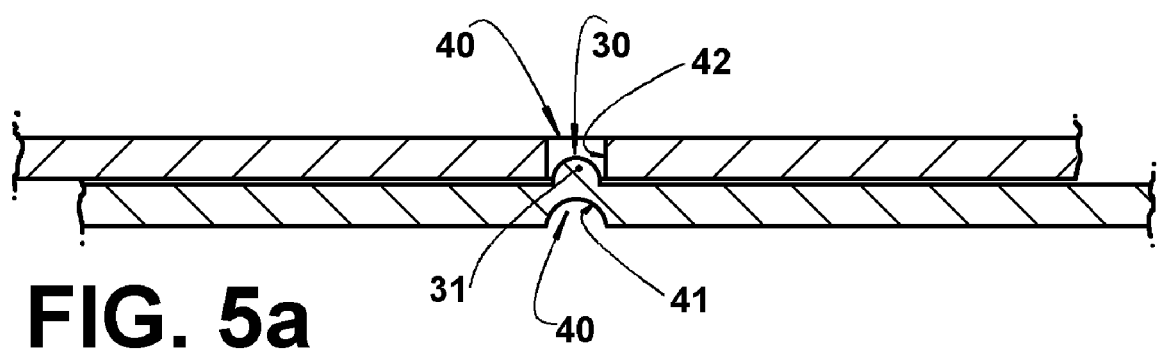

In another way of carrying out the present invention, illustrated in FIG. 5a, the lock receiving means 40 is defined by a hole 42 in one of said laminations, which can be defined as locking laminations 10 or passage laminations 20.

The lock means 30 and the lock receiving means 40 illustrated in FIGS. 5 and 5a are obtained, in a way of carrying out the present invention, upon stamping each lamination of the stack in a lamination stamping station 2 of a lamination producing unit. However, such constructions of lock means 30 and lock receiving means 40 may also be obtained upon assembling each lamination in the lamination stack or also after formation of said stack.

Figure 1C:
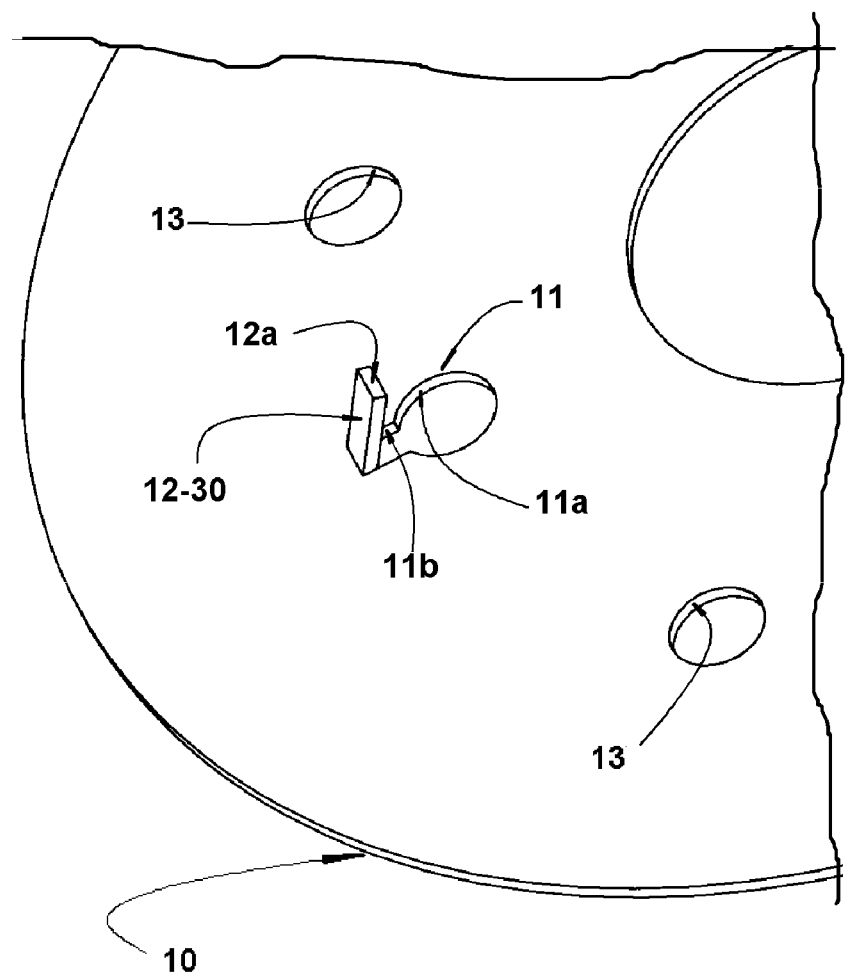
FIG. 1c is a view similar to that of FIG. 1, but illustrating another construction for a locking lamination.
Figure 1D:
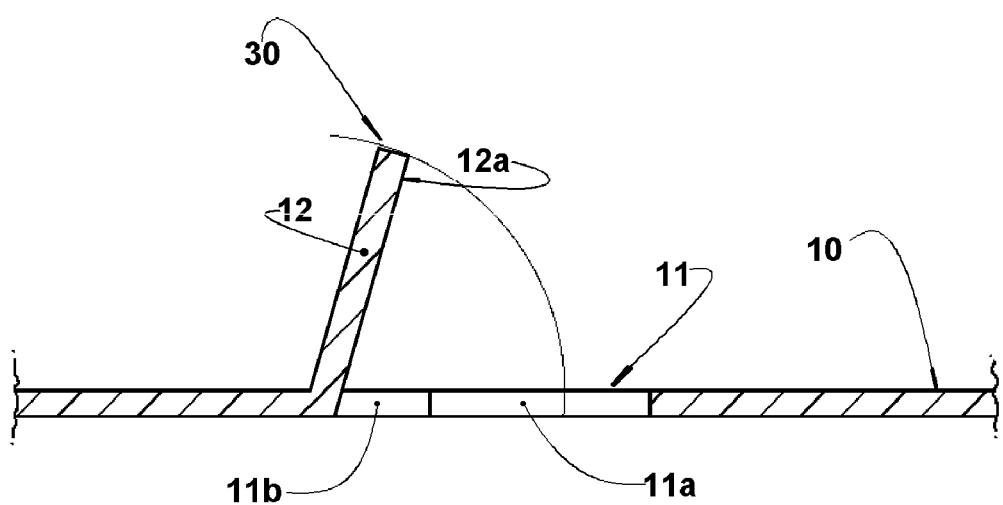
FIG. 1d is a partial sectional view of the locking lamination, taken according to line I-I of FIGS. 1b and 1c, illustrating a tab of said locking lamination.
Figure 2B:
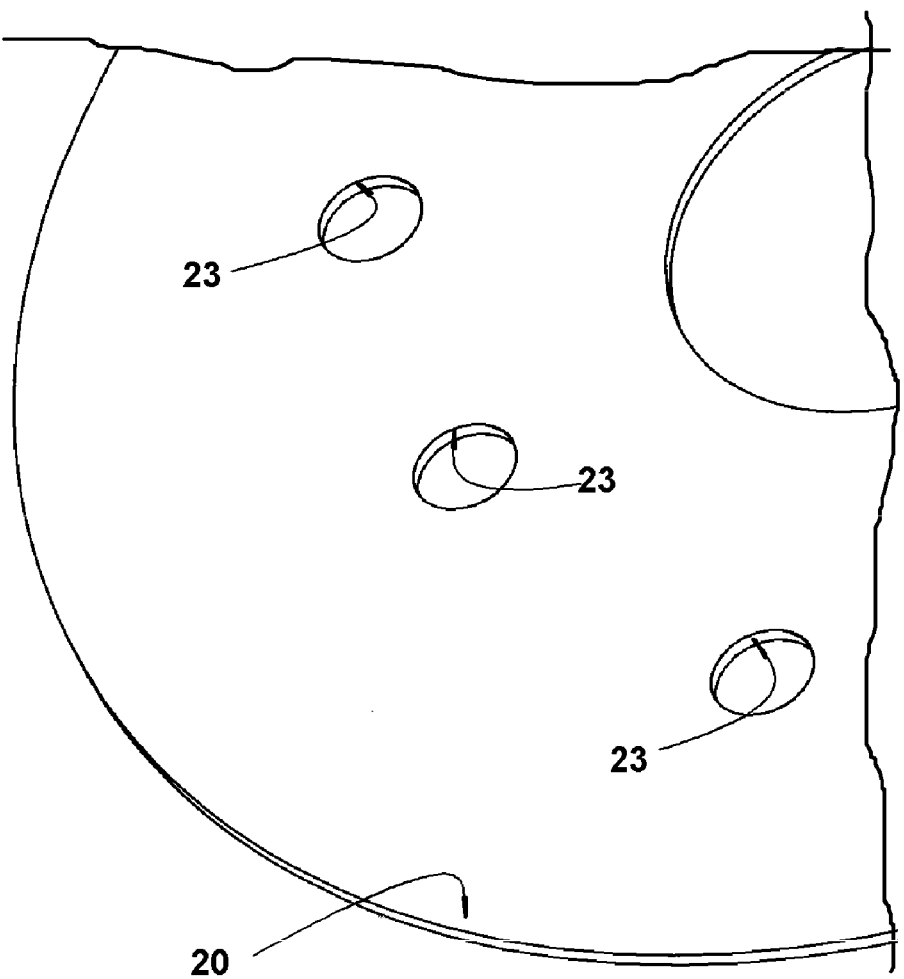
FIG. 2b is a view similar to that of FIG. 2a, but illustrating another construction for the passage lamination.

In another constructive form of the present invention, in which the passage openings 13, 23 are not previously deformed, as illustrated in FIGS. 1c and 2b, the lock means 30 and the lock receiving means 40 are respectively defined by the free end 12a of each tab 12 and by the edge portion 14, 24 of a respective passage opening 13, 23, which is deformed to the interior of a respective locking opening 11, defining a cradle to tightly receive the free end 12a of the respective tab 12 of an adjacent lower lamination of the lamination stack, upon assembling the latter.

In the constructive form mentioned above, the edge portion 14, 24 of each passage opening 13, 23 is deformed by the free end 12a of the respective tab 12 when the latter is bent, and remains laterally locked within the cradle formed with said seating, promoting the rotational locking between two superposed laminations, with no need of providing projections 31 and recesses 41 or holes 42 in said laminations.

For any one of the constructions of lock means 30 and lock receiving means 40, a tight fit of the involved parts should exist with no circumferential gaps, and said fit should be achieved by lateral interference between the mutually seated parts.

In the constructions in which the edge portion 14, 24 is deformed by a previous drawing operation upon the formation of the lamination, defining a recess 14a, 24a for the free end 12a of a corresponding tab 12, the lock means 30 and the lock receiving means 40 are provided, in the lamination of the present invention, spaced from the edge portions 14, 24 of said lamination, taking the form of the already described projections 31 and recesses 41 or holes 42, as illustrated in FIGS. 5 and 5a.

In the construction illustrated in FIGS. 1c and 2b, the free end 12a of the tab 12 is seated and pressed against an adjacent edge portion 14, 24 of the respective passage opening 13, 23 of an adjacent lamination, drawing said edge portion 14, 24 to the side of the locking lamination 10, opposite to the side onto which said tab 12 will be seated, by a value at minimum corresponding to the thickness of the tab 12, so that the free end 12a of the latter remains seated on said edge portion 14, 24, contained in the passage opening 13, 23, without surpassing the plane of the lamination face onto which said tab 12 is bent.

The bending of the tab 12 against an adjacent edge portion 14, 24 defines a tight seating, with no gaps in the circumferential direction, locking two adjacent and consecutive laminations against relative rotational movements, by the free end 12a of the tab 12 laterally interfering with the drawn cradle. In this construction, the free end 12a of the tab 12 of one lamination and the edge portion 14, 24 of a respective passage opening 13 of an adjacent locking lamination 10 define the lock means 30 and the lock receiving means 40.

In the constructions of the present invention, the tabs 12 of each locking lamination 10, when seated on an adjacent upper lamination of the lamination stack, do not project beyond the plane of said adjacent lamination onto which they are bent, as opposed to the prior art constructions, being always maintained in the lamination plane onto which each tab 12 is bent and seated, not interfering with the seating of the other laminations of the stack.

Figure 7:
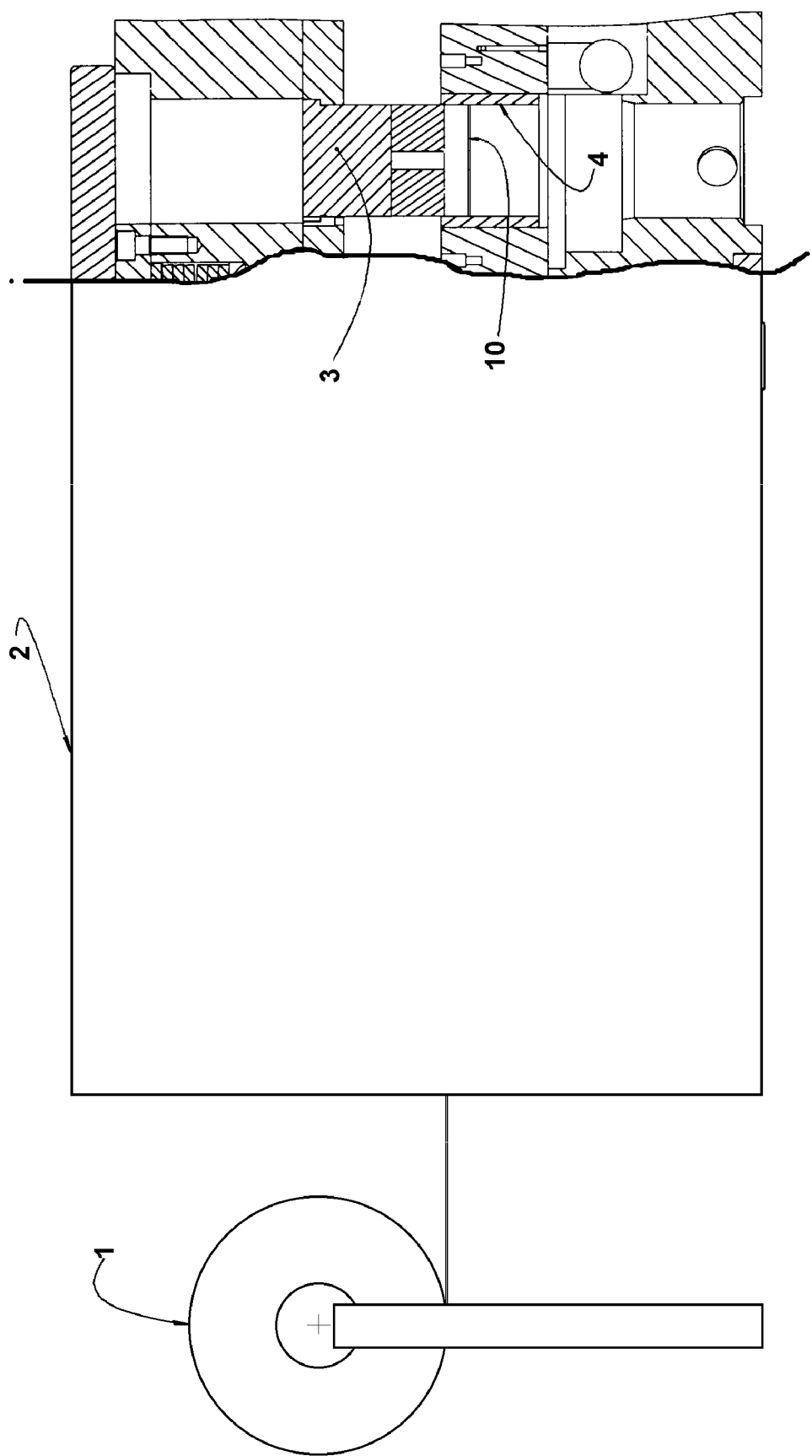
FIG. 7 schematically illustrates a partially cut side view of a lamination stamping station, showing, in a stacking station thereof a first lamination that will from a lamination stack.

The lamination stack of the present invention is obtained by a process generically presenting the steps of:

a—providing a locking lamination 10 with at least two locking openings 11 and incorporating, adjacent to each locking opening 11, a tab 12 projecting to one of the sides of said locking lamination 10 and presenting a free end 12a;

b—conducting said locking lamination 10 to a stacking station 3 of a lamination producing unit, as illustrated in FIGS. 6 and 7;

c—providing a passage lamination 20 with at least two passage openings 23, each defining an edge portion 24, deformed to one of the sides of said lamination 20, in order to define a recess 24a therein;

d—conducting said passage lamination 20 to the stacking station 3, axially aligning and fitting each tab 12 of the locking lamination 10 through a passage opening 23 of the passage lamination 20; and e—pressing each tab 12 of the locking lamination 10 against an adjacent face of the passage lamination 20, opposite to its face to be seated on the locking lamination (10), until each tab 12 is contained in a respective passage opening 23 of the passage opening 20 and partially seated, generally by its free end 12a, in the recess 24a defined in an edge portion 24 of the passage opening 23 of the passage lamination 20, deformed to the inside of the locking opening 11 of the locking lamination 10, axially fastening the latter to the passage lamination 20.

In the constructive option illustrated in FIGS. 1, 1b, 1e, 2 and 2a, the present process comprises a further step of providing the locking lamination 10 with at least two passage openings 13, each defining an edge portion 14, deformed to one of the sides of said locking lamination 10, to define a respective recess 14a dimensioned to receive the free end 12a of a respective tab 12 of an adjacent locking lamination 10.

Figure 1E:
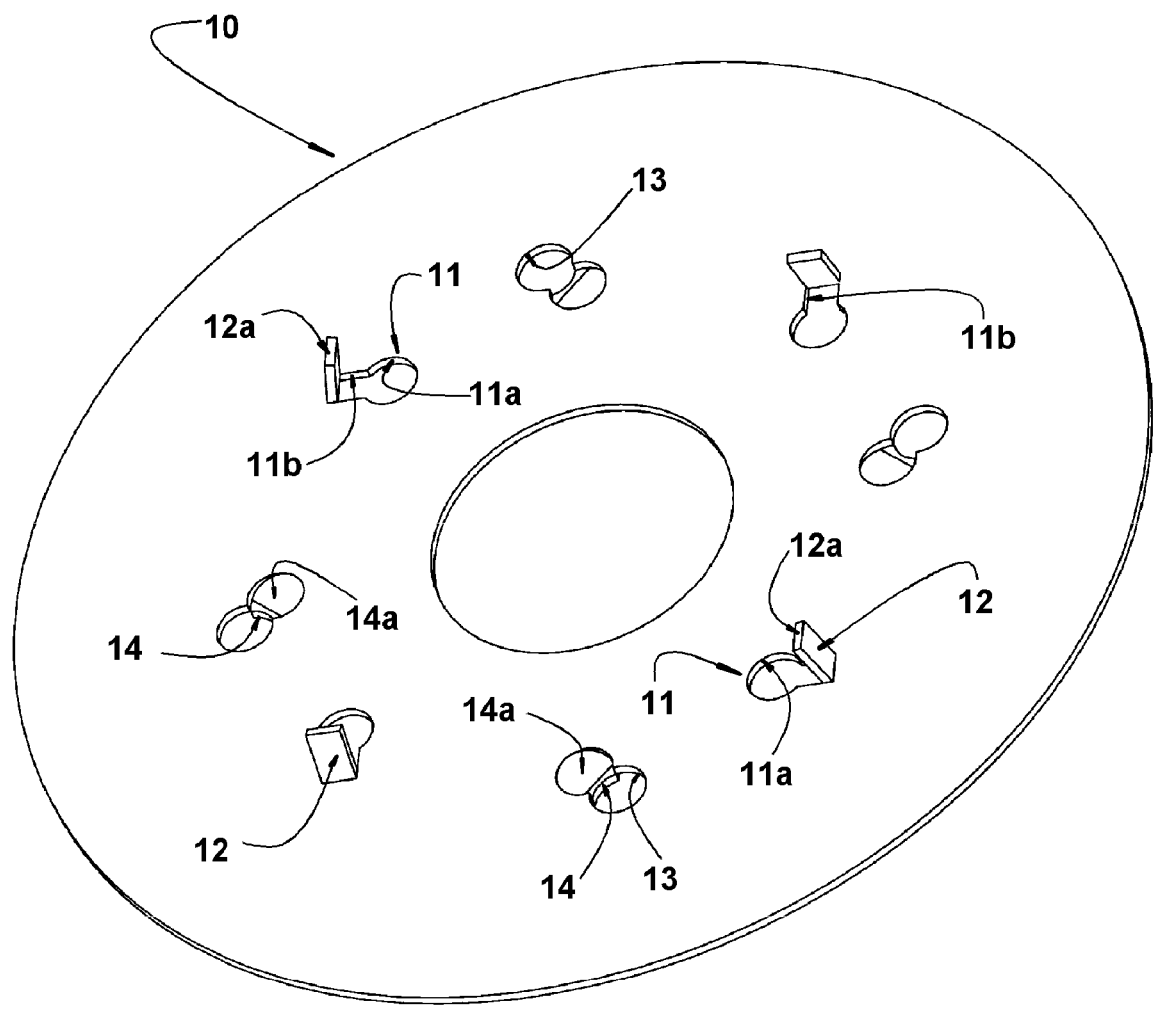
FIG. 1e is a view similar to that shown in FIG. 1, but illustrating another embodiment for the passage openings.

As illustrated in FIG. 1e, the edge portions 14, 24 may present a deformation configuration determining a ramp surface, when the deformation does not lead to shearing or cutting out part of the edge portion submitted to previous deformation.

For a lamination stack made of a plurality of laminations, the present process further comprises the intermediary steps of: providing, between the locking lamination 10 and the passage lamination 20 that form the stack, at least one intermediary lamination defined by one of the locking lamination 10 and passage lamination 20; and conducting the intermediary lamination to the stacking station 2, fitting each tab 12 of a lower locking lamination 10 through a passage opening 13, 23 of an intermediary lamination disposed immediately above, said intermediary lamination being defined by a locking lamination 10 or by a passage lamination 20.

For a lamination stack in which the intermediary laminations are locking laminations 10, the present process includes the further steps of: pressing each tab 12 of the locking lamination 10 against an adjacent face of the intermediary lamination, opposite to its face to be seated on the locking lamination (10), when said laminations are in the stacking station 2, then conducting a passage lamination 20 to the stacking station 2, fitting each tab 12 of the intermediary lamination through a passage opening 23 of the passage lamination 20, pressing each tab 12 of the intermediary lamination over the adjacent face of the passage lamination 20, opposite to its face to be seated onto the intermediary lamination; and pressing each passage lamination 20 over the underlying laminations in the stacking station 2, till each tab 12 is bent and remains contained in a respective passage opening 23 of the lamination traversed by said tab 12 and partially seated on an edge portion 14 of the passage opening 13 of said lamination, deformed to the inside of the locking opening of the respective locking lamination 10, axially locking it to the adjacent upper lamination. It should be understood that, in the case of a lamination stack comprising more than one intermediary lamination of any of the types of locking lamination 10 and passage lamination 20, the process steps above are repeated until a terminating lamination of the stack, generally a passage lamination 20, is disposed on top of the other laminations already contained in the stacking station 3.

In a more specific form, the process for forming the lamination stack of the present invention further comprises the steps described below.

In an initial step, a metal plate 1 is conducted to the lamination stamping station 2 of the lamination producing unit, as illustrated in FIG. 6, where said metal plate 1 is submitted to a punching process, following the phases indicated in said FIG. 6 by references I-V and in which are defined the passage openings 13, followed by the production of the locking openings 11 and respective tabs 12, in the case of stamping a locking lamination 10.

When the laminations to be stamped are those designed to form a motor lamination stack, after defining said locking openings 11 (and passage openings 13, if it is the case) the metal plate 1 is conducted to a step for defining openings adequate to provide, if a lamination stack is to be formed, housings to be filled with aluminum in order to form the motor cage.

After producing the holes that define the desired laminations openings in the metal plate 1, said lamination is then cut out from the metal plate 1 and conducted to the stacking station 3.

FIG. 6 shows a locking lamination 10 being obtained from a metal plate 1, in which for example a plurality of locking openings 11 and passage openings 13 are stamped. Upon stamping each locking opening 11 there are defined a first hollow portion 11a, a second hollow portion 11b and a tab 12, as described above.

According to the illustration in FIG. 6, a metal plate 1 is fed into the stamping station 2 of the lamination producing unit and centered therein through a pair of centralizing holes 1a laterally defined in the metal plate 1, said metal plate 1 being submitted, in phase I of the process for producing the lamination to be stamped, to a production of cutouts according to a circular alignment and which define the passage openings 13, 23, for example, altering the positioning thereof in said circular alignment.

In phase II subsequent to the phase of obtaining said passage openings 13, 23, the metal plate 1 is submitted to a process of cutting out the rotor grooves, according to a circular alignment that is concentric and external to the circular alignment of the passage openings 13, 23. In the following phase (phase III), the locking openings 11 are stamped and submitted to a cutout which defines, for each of said openings, the second hollow portions 11b and respective tabs 12, each of said tabs 12 being then submitted to a bending that angularly projects each said tab 12 towards one of the sides of the metal plate 1. In phase IV of the present process, there are produced the hollow portions 11a of the locking openings 11, the cutouts of the external diameter of the lamination being stamped, and an inner central hole thereof. Then, said lamination is directed, in phase V, to the stacking station 3, where it is taken to a brake-die 4.

The tab 12 which is cutout, for example, by a cutting punch from each second hollow portion 11b, is maintained substantially orthogonal to the plane of the respective locking lamination 10, being so maintained until said lamination is placed in the stacking station 3, where the stack is formed, said stacking station 3 including, for example, a conventional brake-die 4.

In a way of carrying out the present invention, during the stamping operation of each lamination, the latter is submitted to a deformation in the edge portion 14, 24 of each passage opening 13, 23, defining a respective recess 14a, 24a therein, in which the free end 12a of a respective tab 12 is seated, said recess 14a, 24a being made, for example by the cutout and deformation of the edge portion 14, 24, or only deformation, without breaking the metal plate 1 that forms the lamination, as described hereinbefore.

In a way of carrying out the present invention, upon stamping the laminations, there are also defined the lock means 30 and the lock receiving means 40 of each of said laminations, for example, by deforming the metal plate 1 of each lamination, as described hereinbefore.

In accordance with a way of carrying out the process of forming the laminations of the present invention, this process includes steps of forming each edge portion 14, 24, in which each said edge portion 14, 24 is deformed in the stacking station 3, upon bending a respective tab 12 thereon, said edge portions 14, 24 defining respective recesses 14a, 24a for the seating of the free end 12a of a respective tab 12. In this case, each recess 14a, 24a is defined without causing breaks in the lamination, said recess 14a, 24a and the free end 12a of the tabs 12 defining a lock means 30 and a lock receiving means 40, respectively.

Among the steps of the process for forming the lamination stack of the present invention, there are further included the additional steps of submitting at least one of the locking lamination 10 and passage lamination 20, to be mutually seated and fastened, to a relative angular displacement, until each tab 12 of the locking lamination 10 is aligned with a passage opening 13, 23 of an adjacent lamination.

Each stamped lamination is conducted to the stacking station 3 which, upon receiving a lamination, makes it rotate around the central axis of said lamination, before receiving another lamination stamped over one previously disposed in the brake-die 4 of the stacking station 3, said rotation corresponding to an angular distance between each two consecutive passage openings 13, 23 and locking openings 11 in the circumferential alignment of the lamination, so that a passage opening 13, 23 of a lamination disposed on a lamination inferiorly provided in the stacking station 3 is traversed by a tab 12 of said lamination inferiorly positioned in the brake-die 4 of the stacking station 3.

The angle of rotation of the brake-die 4 (or of the lamination to be superiorly disposed in this brake-die 4) is a function of the distribution of the locking openings 11 and passage openings 13, 23 of the laminations that form the present stack, as well as of the quantity of openings defined in each lamination thereof.

In a constructive option illustrated in FIG. 6, considering an arrangement of locking openings 11 alternated with passage openings 13, said openings totalizing 8 cutouts in the lamination being stamped, the brake-die 4 is submitted to rotations of about 45°.

In another constructive option, the laminations in the stacking station 2 are maintained with no rotational movement, and the angular displacement between the passage openings 13, 23 and the locking opening 11 of each two adjacent laminations is obtained during the stamping operation of said adjacent laminations, the stamping angle of a lamination being modified for the consecutive stamping of the next lamination.

After seating each lamination onto a lamination already disposed in the brake-die 4, in an option of the present invention, a deforming element provokes a first deformation of the tabs 12 onto the adjacent face of the lamination traversed by said tabs 12, before a new lamination is placed in the stacking station 3.

In another option of the present invention, the previous deformation of the tabs 12 is achieved by depositing a third lamination on top of the two laminations previously disposed in the stacking station 3, this process occurring successively until the last lamination of the thus formed stack has been placed.

For every new lamination disposed in the stacking station 3, the tabs 12 of the underlying lamination are submitted to a new bending degree, until said tabs 12 are contained in the passage opening 13, 23 of an adjacent lamination superiorly disposed in the lamination stack being formed.

Figure 2C:
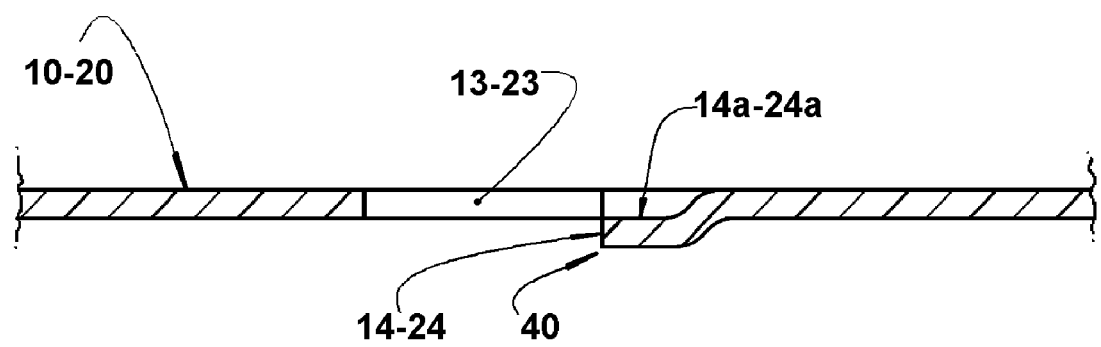

In a way of carrying out of the present invention, all laminations of the stack are equal, being similar to the locking lamination 10. In another constructive option, only the last lamination of the stack differs from the previous ones, said last lamination being a passage lamination 20 of the type illustrated in FIGS. 2 and 2c.

The stacking station 2 can further receive, over the last lamination of the stack, a non-illustrated blind lamination, which separates the stacks formed by the present process and which can be, for example, a passage lamination 20 or also a lamination provided with the locking openings 11 and passage openings 13, but without being submitted to the formation of the tabs 12.

The solution of the present invention provides a lamination stack, whose laminations are rotatively and axially locked between each two adjacent laminations, turning the stack less fragile than those of the known prior art discussed herein, requiring a shorter time to be manufactured and in which the process for obtaining these laminations requires fewer steps than the processes for obtaining laminations of the known constructions, without requiring so much accuracy from the tools used.

Alternative embodiments will be recognized as possible by those skilled in the art and intended to be included in the scope of the claims. Thus, the description above should be construed only as illustrative and not as limitative of the protective scope of the invention. All such obvious changes and modifications are included in the protective scope defined by the appended claims.

The invention claimed is:

1. A process for forming a stack of superposed metallic laminations, characterized in that it comprises the steps of:
   providing a locking lamination with at least two locking openings and incorporating, adjacent to each locking opening, a tab projecting to one of the sides of said locking lamination;
   providing a passage lamination with at least two passage openings, each defining an edge portion that is deformed to one of the sides of said passage lamination;
   axially aligning and fitting each tab of the locking lamination through a passage opening of the passage lamination; and
   pressing each tab of the locking lamination against an adjacent face of the passage lamination, opposite to its face to be seated on the locking lamination, until each tab is contained in a respective passage opening of the passage lamination and partially seated on an edge portion of the passage opening of the passage lamination, deformed to the inside of the locking opening of the locking lamination (10), axially locking the latter to the passage lamination.

2. The process as set forth in claim 1, characterized in that it comprises the additional step of providing the locking lamination with at least two passage openings, each defining an edge portion deformed to one of the sides of said passage lamination.

3. The process as set forth in claim 1, characterized in that it comprises the intermediary steps of:
   providing, between the locking lamination and the passage lamination of the stack, at least one intermediary lamination defined by one of said locking lamination and passage lamination; and
   conducting the intermediary lamination to the stacking station, fitting each tab of a lower locking lamination through a passage opening of an intermediary lamination disposed immediately above.

4. The process as set forth in claim 3, in which the intermediary lamination is a locking lamination, characterized in that it includes the additional steps of:
   pressing each tab of the locking lamination against an adjacent face of the intermediary lamination, opposite to its face to be seated onto the locking lamination;
   conducting the passage lamination to the stacking station, fitting each tab of the intermediary lamination through a passage opening of the passage lamination;
   pressing each tab of the intermediary lamination against an adjacent face of the passage lamination, opposite to its face to be seated onto the intermediary lamination; and
   pressing each passage lamination over the laminations inferiorly disposed in the stacking station, until each tab is bent and contained in a respective passage opening of the intermediary lamination traversed by said tab and partially seated on an edge portion of the passage opening of said lamination, deformed to the inside of the locking opening of the respective locking lamination, axially locking the latter to the adjacent upper lamination.

5. The process as set forth in claim 1, characterized in that it comprises the additional step of providing at least one of the parts of locking lamination and passage lamination with a lock means actuating in a lock receiving means 40 provided in the other of said parts, so as to provide a relative rotational locking between each two adjacent laminations in the stacking station.

6. The process as set forth in claim 5, characterized in that it includes an additional step of providing each intermediary lamination with at least one of the parts of lock means and lock receiving means, so as to provide a relative rotational locking between each two adjacent laminations in the stacking station.

7. The process, as set forth in claim 5, characterized in that the lock means and the lock receiving means of each lamination are provided during the stacking of the laminations in the stacking station.

8. The process, as set forth in claim 5, characterized in that the lock means and the lock receiving means of each lamination are provided upon the stamping of each lamination.

9. The process as set forth in claim 1, characterized in that, in step "a", it provides, in each locking lamination, the passage openings and locking openings in alternate relationship in the same alignment.

10. The process as set forth in claim 9, characterized in that, in step "a", the locking openings and passage openings of each locking lamination are medianly distributed in the same circular alignment around the central axis of the respective locking lamination.

11. The process, as set forth in claim 1, characterized in that it comprises the additional steps of:

submitting at least one of the locking lamination and passage lamination to a relative angular displacement, until each tab of the locking lamination is aligned with a passage opening of an adjacent lamination;

submitting each tab of a locking lamination to a first deformation, so that said tab is contained in a passage opening of the passage lamination; and making each tab, provided with said first deformation, to seat on an edge portion of the passage opening of the passage lamination, in order to deform said edge portion.

12. The process, as set forth in claim 1, characterized in that it comprises an additional step of submitting each locking lamination and passage lamination, upon stamping thereof, to a deformation in the edge portion of each passage opening, defining therein a respective recess in which a respective tab is seated.

13. The process, as set forth in claim 1, characterized in that each edge portion is deformed, by pressing each tab against a respective and adjacent edge portion of a passage opening of a lamination placed over a locking lamination.

14. The process as set forth in claim 1, characterized in that each tab is obtained by a cutting punch.

15. The process as set forth in claim 1, characterized in that the locking laminations and passage laminations are equal.

* * * * *